July 1, 1958
G. B. LETT
2,840,857
APPARATUS FOR REMOULDING OR RETREADING
TYRES FOR VEHICLES
Filed Jan. 13, 1955
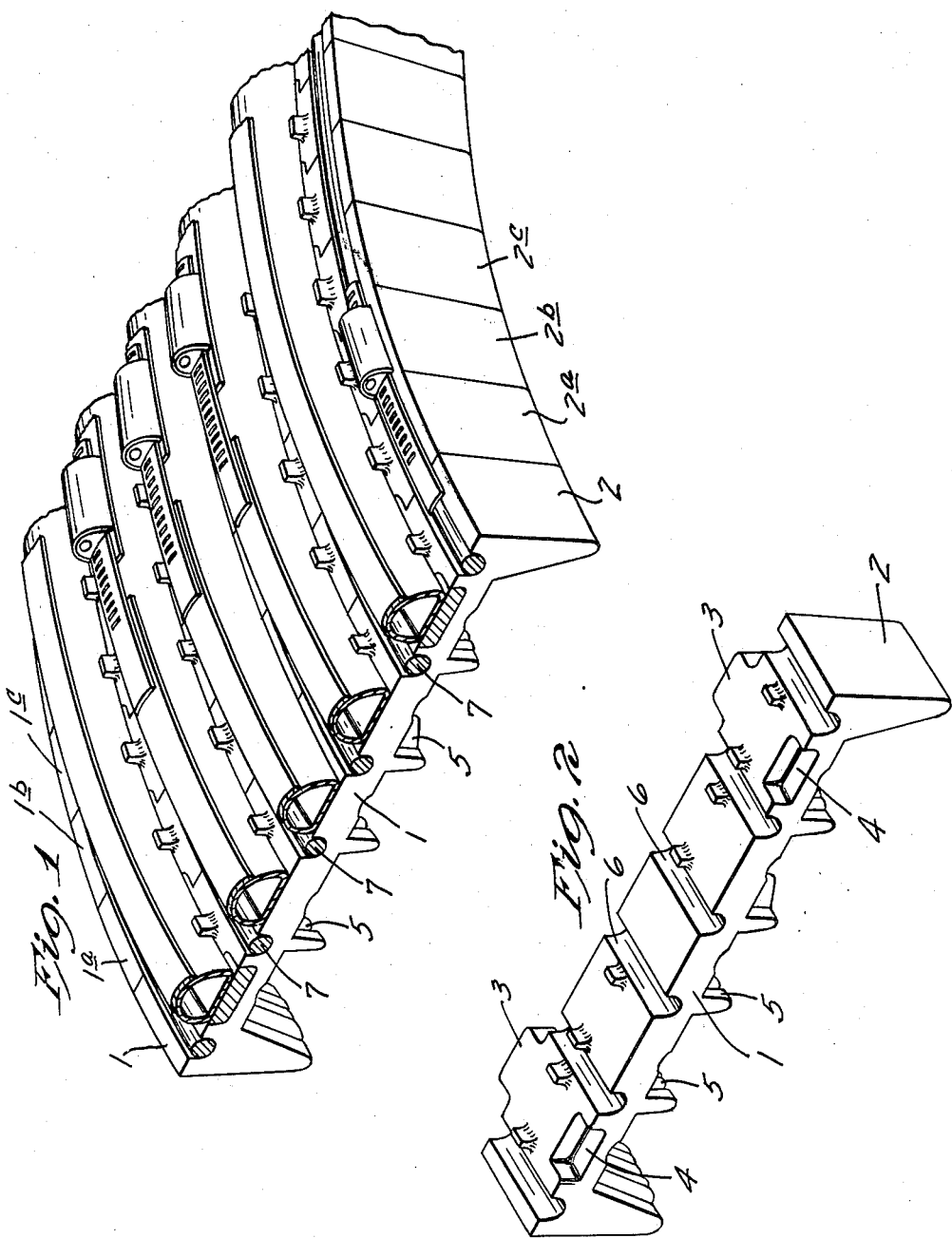
INVENTOR.
Geoffrey Brotherton Lett
BY
Merchant & Merchant
ATTORNEYS

United States Patent Office 2,840,857
Patented July 1, 1958

2,840,857

APPARATUS FOR REMOULDING OR RETREADING TYRES FOR VEHICLES

Geoffrey Brotherton Lett, London, England, assignor to Earle W. Hawkinson, Minneapolis, Minn.

Application January 13, 1955, Serial No. 481,633

Claims priority, application Great Britain January 15, 1954

2 Claims. (Cl. 18—44)

This invention relates to apparatus for remoulding or retreading tyres for vehicles and has for its main object to provide an improved form of mould for effecting such remoulding or retreading which is economic to manufacture and which at the same time is able to perform its desired functions, efficiently.

In moulds of this kind heretofore known, the tread pattern is usually formed either by casting or engraving pattern forming members in the solid metal of the tread matrix by rolling or stamping such members in a sheet metal ring or by securing cast metal inserts to the rigid metal base of the mould, or to a sheet metal ring, but all these moulds suffer from the disadvantage that they are either costly to produce or limited in the tread design while in all cases they are restricted to a predetermined size of tyre.

The present invention, however, consists in an apparatus for the purpose referred to, comprising a plurality of members which form the segmental parts of a mould of annular cross-section, each of such members being adapted to form a section of a complete width of tread to be moulded.

According to the preferred arrangement, means are provided for detachably securing the said members together, and the members are of such a length that the number of members may be varied to produce complete moulds of different predetermined diameters.

The invention will be more completely understood from the following detailed description which is given in conjunction with the accompanying drawing in which:

Figure 1 is a perspective view of part of a mould embodying a plurality of segmental parts constructed in accordance with the invention, and Figure 2 is a perspective view of one of the segmental parts shown in Figure 1.

Referring now to this drawing, I construct my improved mould in the form of a plurality of segmental parts or sections 1, 1a, 1b, 1c etc. each of which conveniently consists of a light metal alloy casting, the width of which is such as to produce the desired width of tyre tread, and the length and external shape of which is such that when a predetermined number of such parts or sections are disposed in succession with the edges of the adjacent parts butting together, they form a mould of annular cross-section and of predetermined diameter; such diameter being that required for the tyre to be retreaded. Conveniently, the segments or sections are of shallow flattened U-shaped section, and the axial outer sides 2, 2a, 2b, 2c etc. of each part are slightly tapered to the required angle so that the parts when assembled, form a complete annulus and the opposite edges formed by the circumferentially spaced radially disposed sides and the radial outer surface of the mold sections may be provided with axially spaced circumferentially outwardly projecting elongated elements, such as tongues 3, and axially spaced circumferentially inwardly opening element receiving recesses, such as slots 4, so that when the mold sections 1, 1a, 1b, 1c are assembled the tongues of one part engage with the slots of the next succeeding part, thus locking the parts together and preventing them from moving in a lateral direction.

Alternatively, this interlocking may be effected by dowel pins and holes or by other suitable means. The segmental parts are cast in such a way that the radial inner surface carries the desired tread pattern 5, and the radial outer surface in addition to carrying the aforesaid interlocking tongues and slots is provided with a set of parallel grooves 6 which align with one another when the parts are assembled and provide locating means for a set of steel wires 7, which are arranged to surround the parts after assembly, so as to hold the parts together and lock them into a rigid mould, the wires being tightened and locked by means of turn buckles or other suitable devices.

The segmental parts are thus held tightly and securely together to form an annular mould. Air vents are drilled through the cast segments in suitable places and the mould heated by copper tubing in helical form clamped round the outer periphery of the mould through which steam or other heating fluid may be circulated. Alternatively, the mould may be heated by electrical means or by placing the tyre and mould assembly in open steam under pressure.

The length of each segmental part is either a divisor or multiple of $\pi$ so that when assembled and locked together an annulus mould is formed of identical segments thus greatly reducing the costs of producing the moulds and permitting moulds of any desired diameter to be manufactured from the same size of segments.

Conveniently, the length of each of the aforesaid segmental parts is $$\frac{\pi}{4}$$

units so that by varying the number of parts in a complete annular mould the diameter of such mould may be varied by a quarter of a unit, and the number of segmental parts required for any predetermined size of mould would be the number of units equivalent to four times the diameter of such mould.

The segmental parts are preferably cast with tread forming members as integral parts of the inner faces. The design of the tread pattern may take any desired form and may incorporate in the tread rib forming grooves, and one or more supplementary grooves for locating helical wire coils for improving the non-skid properties of the tread pattern.

I claim:

1. An apparatus for retreading pneumatic tire casings comprising a plurality of segmental mold sections each having circumferentially spaced radially disposed sides, each of said mold sections being circumferentially arcuate intermediate the sides and of shallow generally U-shape in axial cross-section with the circumferential arcuate length of each mold section being substantially equal to ¼ pi, each of said mold sections having at least one circumferentially extending groove in the radial outer surface and a desired tread pattern on the radial inner surface thereof, each of said mold sections further having a circumferentially outwardly projecting elongated element on one of the radially disposed sides and a circumferentially inwardly opening element receiving recess on the opposed radially disposed side, said mold sections being arranged in side by side abutting relationship with the outwardly projecting elongated element of each mold section being received within the inwardly opening recess of the next adjacent mold section to provide an annular mold with the grooves in the radial outer surfaces of the mold sections circumferentially aligned and with said outwardly projecting elongated elements and inwardly opening recesses locking the respective mold sections against axial movement relative to each other, and an annular, flexible band-type member disposed in the circumferentially aligned grooves for locking said mold sections in said side by side abutting relationship, said member including a releasable means for releasing the band-type member to adjust and change the diameter of the annular mold by the removal therefrom or the addition thereto of a given number of the mold sections.

2. The apparatus as set forth in claim 1, wherein each of the elongated elements and element receiving recesses are positioned on the respective mold sections at the opposite edges thereof defined by the radially disposed sides and the radial outer surface.

References Cited in the file of this patent

UNITED STATES PATENTS

| | | |
|---|---|---|
| 1,910,128 | Semler | May 23, 1933 |
| 2,315,721 | Martin | Apr. 6, 1943 |
| 2,440,321 | Bacon | Apr. 27, 1948 |
| 2,599,433 | Cohen | June 3, 1952 |

FOREIGN PATENTS

| | | |
|---|---|---|
| 427,284 | Great Britain | Apr. 18, 1935 |